July 3, 1956 R. WIDEROE 2,753,503
REVERSIBLE MOTOR CONTROL SYSTEM FOR REGULATING A VARIABLE
Filed Feb. 19, 1953 2 Sheets-Sheet 1

INVENTOR
Rolf Wideroe
BY Pierce Scheffler & Parker
ATTORNEYS

July 3, 1956 R. WIDEROE 2,753,503
REVERSIBLE MOTOR CONTROL SYSTEM FOR REGULATING A VARIABLE
Filed Feb. 19, 1953 2 Sheets-Sheet 2

INVENTOR
Rolf Wideroe
BY Pierce, Scheffler & Parker
ATTORNEYS

United States Patent Office 2,753,503
Patented July 3, 1956

2,753,503

REVERSIBLE MOTOR CONTROL SYSTEM FOR REGULATING A VARIABLE

Rolf Wideroe, Ennetbaden, Switzerland, assignor to Aktiengesellschaft Brown, Boveri & Cie, Baden, Switzerland, a joint stock company Application February 19, 1953, Serial No. 337,829

Claims priority, application Switzerland February 21, 1952

4 Claims. (Cl. 318—281)

The present invention concerns a method for automatic regulation of a variable value (independent variable) to that value, which is correlated with a maximum of a value depending on it, and which is also influenced by accidental disturbances. The new method is characterized by the fact that the independent variable is continuously varied in one of the two possible senses of variation, i. e. decreased or increased, that the value of the dependent variable is determined in, preferably periodically succeeding, intervals and that the sense of the variation of the independent variable is always reversed when the value of the dependent variable has decreased during a scanning period by at least a certain amount, compared to the value found at the beginning of the scanning period.

The invention also concerns an apparatus for carrying into effect the above mentioned method. It is characterized by means providing continuous variation of the independent variable, by an accumulator which retains, at least approximately, the value of the dependent variable, determined at the beginning of the scanning period, for the duration of a scanning period, by switching devices which apply the instantaneous value of the dependent variable in periodic intervals to the accumulator and by means which ascertain the amount and sense of difference between the value of the dependent variable and the stored value, and which reverse the sense of the variation of the independent variable, if, during the scanning period, the difference, corresponding to a decrease of the dependent variable, exceeds a certain amount.

The invention is illustrated in the accompanying drawings wherein.

Figure 1:
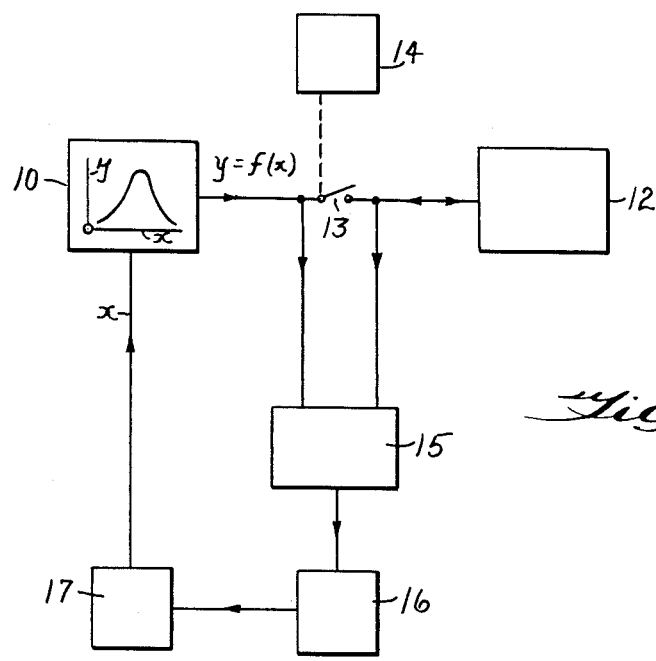
Fig. 1 is a block schematic electrical diagram showing one practical arrangement of circuit components by which the desired control over the variable is obtained.

In the diagram in Fig. 1 is a member 10 whose output value $y$ is dependent on the input value $x$ in such a way that for a certain value of the independent variable $x$, the dependent variable $y$ presents a maximum. The independent variable $x$ is continuously varied in one sense by the device 17. 12 is an accumulator such as a capacitor which can be connected by the switch 13 with the output end of the member 10. The switch 13 normally open is temporarily closed by the assembly 14, preferably in periodic intervals such as by a clockwork. After opening the switch 13 the stored value retains, at least approximately until the next closing of the switch, that value, which was determined at the previous closing at the output of the member 10. The assembly 15 measures the difference, appearing over the terminals of switch 13 when open, between the stored value and the instantaneous value (output value) of the member 10. If the output value drops in the course of a scanning period by a certain amount below the stored value, then the assembly 15 responds, making the control device 16 reverse the sense of the variation of the independent variable $x$ by the device 17.

Figure 2:
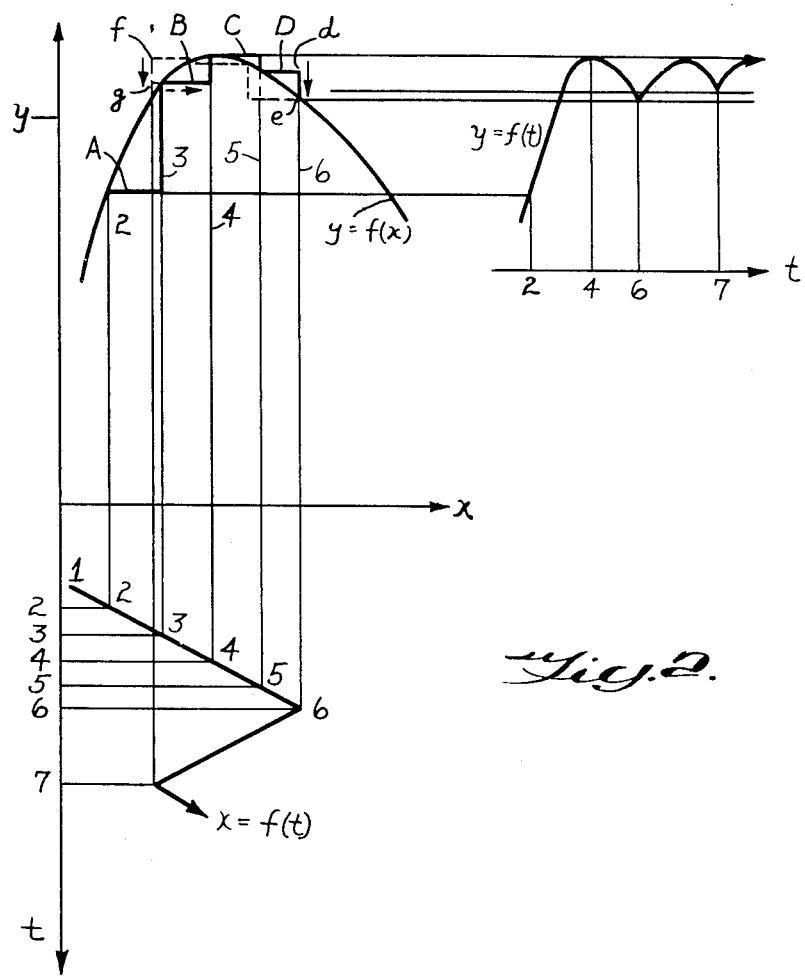
Fig. 2 is plot of curves illustrating the response characteristic of the control elements as related to time.

The method of operation is again explained by means of Fig. 2. Here the curve $y$ equals $f(x)$ represents the dependence of the variable $y$ on the independent variable $x$; plotted underneath is the dependence of the variable $x$ on the time $t$. When the regulation becomes effective, the independent variable is continuously increased, for example from the interval (1). At the interval (2) the accumulator is connected with the instantaneous value A of the variable $y$. This value A is retained in the accumulator until the next closing of the switch, which takes place at the interval (3). At the interval (3) the instantaneous value of $y$ has increased to the value B and this new value remains in the accumulator until the next scanning period. At the interval (4) $y$ has reached its maximum value which is again stored for the next scanning period (value C). At the interval (5) $y$ has dropped somewhat and accordingly the value D is stored. Before the next scanning period is finished, however, the difference between the instantaneous value of $y$ and the stored value D at the interval (6) has reached a certain amount which is represented by the distance $d$, $e$. When this amount has been reached, the sense of the continuous variation of $x$ is reversed, according to the invention. The stored values thus run from the interval (6) along the broken line to the left until the difference between the instantaneous value of $y$ and the stored value has again exceeded an amount which is represented by the distance $f$, $g$ (interval 7). At this instant the direction of the continuous variation of $x$ is again reversed. The right upper corner of Fig. 2 shows the course of the variable $y$ with respect to time. It can be seen that $y$ therefore always varies in the close vicinity of its maximum value.

Figure 3:
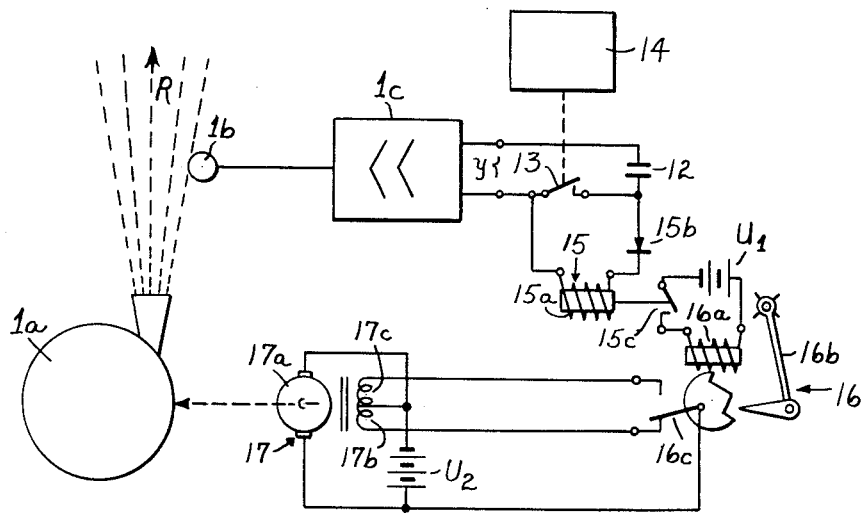
Fig. 3 is electrical schematic view illustrating an application of the invention to control over the X-ray radiation produced from an electron accelerator of the betatron type.

A practical application for the regulating device according to the invention is represented in Fig. 3. The purpose of the device is to maintain the X-ray radiation, produced by a betatron, at least approximately at its respective maximum value independent of variations in the voltage and frequency of the power supply source. The regulation can be effected by changing the phase position between the supply voltage and the time of the periodic introduction of the electrons into the betatron. In this example, therefore, the phase position of the electron introduction is the independent variable and the intensity of the X-rays the dependent variable.

In Fig. 3, $1a$ represents the betatron, or ray transformer as the device is known in Europe, which produces the X-rays R. An ionization chamber for measuring the intensity of the X-rays is shown diagrammatically at $1b$. The intensity measurement in terms of voltage is amplified in an electronic amplifier shown diagrammatically at $1c$ and then applied to output terminals $y$. A capacitor 12 is connected in circuit with terminals $y$ and it will be seen that in one side of these connections there is placed a single pole, single throw switch 13. The contacts of switch 13 are normally open but a periodic operating device, which may be controlled by a clockwork for example and which is shown diagrammatically at 14 serves to close these contacts briefly at periodic intervals. Whenever switch 13 is closed, it will be evident that the voltage at terminals $y$ at that instant will be applied to capacitor 12 and charge the latter to that voltage. The switch then reopens and it will then be seen that the voltage on capacitor 12 and that at terminals $y$ are thus connected in series opposition at the open terminals of the switch. Consequently the voltage appearing across the terminals of switch 13 when open represents the difference between the voltage on capacitor 12, which holds until the next connection period with terminals $y$, and the voltage at terminals y. Such difference voltage is applied to the coil 15a of a relay 15, the relay coil 15a and a rectifier 15b forming a series circuit that is connected in parallel with the terminals of switch 13. The arrangement is such that whenever switch 13 is open and the voltage at terminals y decreases by a certain amount below the voltage at capacitor 12, relay 15 closes its contacts 15c thereby completing a circuit for energizing the coil element 16a of a reversing relay 16 from a source of potential U1. Relay 16 is of such construction that each time its coil 16a is energized, i. e. pulsed, the relay armature 16b functions to throw the relay contact blade 16c from one to the other of its two possible positions. In the one position of the blade 16c as shown in the drawing, the armature 17a and field winding 17b of motor 17 are connected to the source of potential U2 thus causing the motor armature 17a to run in one sense to thereby vary in a corresponding sense the value of the independent variable, i. e. the phase position of the electron introduction means of the betatron 1a. The next time that relay 16 is pulsed, relay contact blade 16c is shifted to its other position wherein the armature 17b and the other field winding 17c of motor 17 are connected to voltage source U2 thus causing a reversal of the motor field and hence a reversal of rotation of armature 17a so as to rotate in the opposite sense and hence vary in an opposite sense the value of the phase position of the electron introduction means.

Naturally many modifications can be made, compared to the example illustrated in Fig. 3, without changing the principle of the regulation. For example, the control device consisting of the rectifier 15b and relay 15 can be replaced by a polarized relay or, with advantage, by an electronic device which permits the measuring of the voltages appearing across the switch 13 without current consumption. This has the advantage that the capacity of the capacitor 12 can be kept low without reducing the charge accumulated during a scanning period, due to current consumption.

Regulating devices according to the invention also contain with advantage a device which reverses the direction of the variation of the independent variable every time the variable has reached the limit of its variation range. Thus one achieves automatic regulation in the desired manner when the apparatus is switched in, because, even if the variation should take place first in the wrong direction (that is away from the maximum) the direction will be reversed after a certain time.

I claim:

1. Apparatus for automatically regulating a first and independent variable approximately to that value correlated with a maximum of a second variable that is dependent upon and varies with said first variable comprising means for varying said first variable continuously in a given sense, an accumulator, means periodically connecting said second variable to said accumulator whereby to charge said accumulator with the instantaneous value of said second variable, said accumulator retaining said charge during the period between successive periodic connections thereto of said second variable, means comparing the charged value of said accumulator during each period between successive connections between said accumulator and second variable with the instantaneous value of said second variable to obtain their difference, and means responsive to said difference for reversing the sense of variation of said first variable when during any period the sense of such difference reflects a decrease in said second variable beyond a predetermined amount.

2. Apparatus for automatically regulating an independent variable as defined in claim 1 and which further includes means for also reversing the sense of the variation of said independent variable when the latter reaches the limit of its range of variation.

3. Apparatus for automatically regulating a first and independent variable approximately to that value correlated with the maximum of a variable voltage that is dependent upon and varies with said first variable comprising means for varying said first variable continuously in a given sense, a capacitor, circuit means connecting said capacitor to said voltage, said circuit means including a normally open switch located in one side of said circuit means thereby to arrange said variable voltage and said capacitor in series at the switch when open, means periodically operating said switch to its closed position thereby to apply said variable voltage to said capacitor, means connected in parallel with the terminals of said switch when open for comparing the voltage on said capacitor with said variable voltage for obtaining their difference, and means responsive to said difference voltage for reversing the sense of variation of said first variable when the sense of such difference reflects a decrease in said variable voltage beyond a predetermined amount.

4. Apparatus for automatically regulating an independent variable as defined in claim 3 wherein the said means for comparing the voltage on said capacitor with said variable voltage is comprised of a relay having its coil and a rectifier connected in series across said switch.

References Cited in the file of this patent

UNITED STATES PATENTS

| 2,456,573 | White et al. | Dec. 14, 1948 |
| 2,585,640 | Everitt | Feb. 12, 1952 |
| 2,651,022 | Shelley | Sept. 1, 1953 |
| 2,699,504 | Miller et al. | Jan. 11, 1955 |